Figure 1:
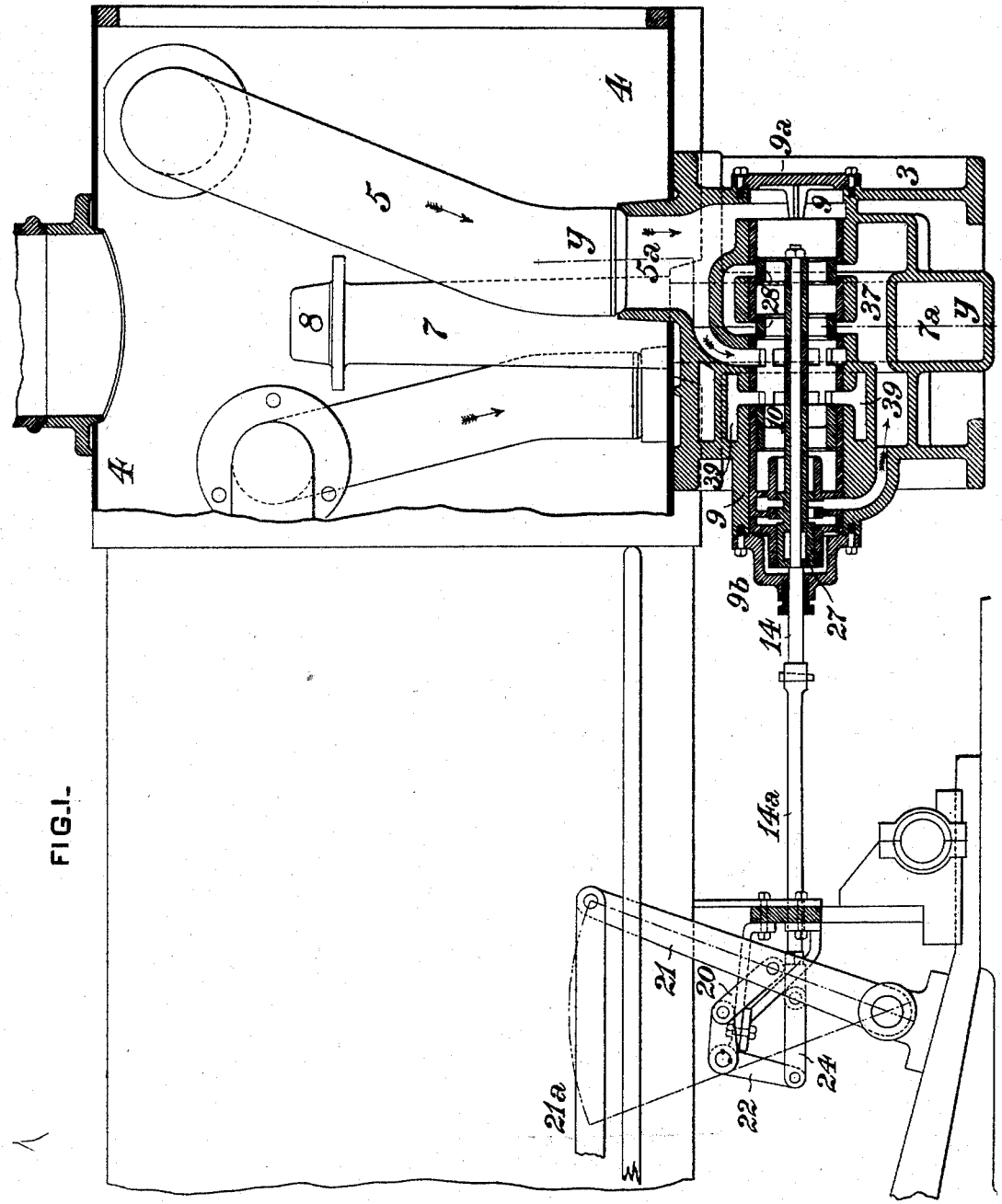

(No Model.) 5 Sheets—Sheet 1.

H. J. SMALL & C. T. NOYES.
STARTING APPLIANCE FOR COMPOUND ENGINES.

No. 503,390. Patented Aug. 15, 1893.

WITNESSES:
T. J. Hogan.
F. E. Gaither.

INVENTORS,
Henry J. Small,
Chas. T. Noyes,
by J. Snowden Bell, Att'y.

(No Model.)  5 Sheets—Sheet 2.

H. J. SMALL & C. T. NOYES.
STARTING APPLIANCE FOR COMPOUND ENGINES.

No. 503,390.  Patented Aug. 15, 1893.

WITNESSES:
T. J. Hogan.
F. E. Gaither.

INVENTORS,
Henry J. Small
Chas. T. Noyes
by Snowden Bell,
Att'y.

(No Model.) 5 Sheets—Sheet 3.

H. J. SMALL & C. T. NOYES.
STARTING APPLIANCE FOR COMPOUND ENGINES.

No. 503,390. Patented Aug. 15, 1893.

WITNESSES:
T. J. Hogan.
T. E. Gaither.

INVENTORS,
Henry J. Small,
Chas. T. Noyes,
by J. Bowden Bell,
Att'y.

(No Model.) 5 Sheets—Sheet 5.

H. J. SMALL & C. T. NOYES.
STARTING APPLIANCE FOR COMPOUND ENGINES.

No. 503,390. Patented Aug. 15, 1893.

WITNESSES:
T. J. Hogan.
F. E. Gaither.

INVENTORS,
Henry J. Small,
Chas. T. Noyes,
by J. Snowden Bell,
Att'y.

UNITED STATES PATENT OFFICE.

HENRY J. SMALL AND CHARLES T. NOYES, OF SACRAMENTO, CALIFORNIA.

STARTING APPLIANCE FOR COMPOUND ENGINES.

SPECIFICATION forming part of Letters Patent No. 503,390, dated August 15, 1893.

Application filed April 7, 1893. Serial No. 469,426. (No model.)

*To all whom it may concern:*

Be it known that we, HENRY J. SMALL and CHARLES T. NOYES, of Sacramento, in the county of Sacramento and State of California, have invented a certain new and useful Improvement in Starting Appliances for Compound Engines, of which improvement the following is a specification..

The object of our invention is to provide a simple, efficient, and positively actuated device, designed more particularly for application in two cylinder compound locomotive engines, whereby the engine may, when starting a train, be caused to operate practically as a simple engine, by the direct admission of boiler steam to, and the independent exhaust of steam from, each of its cylinders, such operation being maintained so long as the distribution valves continue to be worked at full stroke in either forward or back motion, as is usual in starting a train with either a simple or a compound engine, and being terminated, and succeeded by the ordinary and normal compound operation, in and by the movement of the valve gear, by the engineer, into position to effect a shorter range of travel of the valves, such as is the proper and usual practice after the train has been started and is under way.

The improvement claimed is hereinafter fully set forth.

In the several types of two cylinder compound locomotives which have heretofore been employed in practice, provision is usually, if not invariably, made for the direct admission of boiler steam to both cylinders in order to facilitate or to effect the starting of the train, by appliances generally termed "intercepting valves." These are of various constructions, and are usually adapted to be automatically opened in starting, so that each cylinder will then be supplied with steam from the boiler, and the work of the two cylinders will be done, at the start, in the manner of independent coupled simple engines. In automatically operating valves, after one or more revolutions have been made, but always very shortly after the throttle has been opened, the intercepting valve is automatically closed, and the low pressure cylinder is then supplied with steam only from and by the exhaust of the high pressure cylinder, as in the ordinary operation of compound engines. Such automatically acting intercepting valves depend for their operation upon variations of pressure on their opposite sides, and the ordinary intercepting valve mechanisms, whether automatic or hand operated, are usually made up of several parts, sometimes operating independently one of another, and involving more or less complication of structure. It is, of course, essential that all parts of the intercepting valve mechanism shall operate properly, both severally and collectively, in order that the engine may perform satisfactory service, and if, from any cause, any member of the appliance fails to perform its designed function, much difficulty is experienced in starting the engine slowly, and without jerking, especially when coupled to a heavy train. In actual practice, the unsteady, jerking motion in starting trains has been found to cause great annoyance to passengers, and, in freight service, has been the cause of many broken draw heads, and the delay and expense resultant therefrom.

Our invention is designed to avoid this objection by the provision of a positively acting appliance, operated by the engineer in and by the movement of the reverse lever made in starting the train, without requiring any other or further manipulation, and without dependence upon automatic action, or that of independently moving disconnected parts. Its operation is such that in starting a train, the engine works as a simple engine, not merely for a single revolution or thereabout, as in the case of the ordinary automatic intercepting valve, but until the train is well under way and the engineer "hooks up" the lever to the desired running position, when, by and coincidently with such movement of the lever, the appliance is moved into position to cut off the previous independent supply and exhaust of the two cylinders, and the engine works as a compound, in the usual manner.

Figure 2:
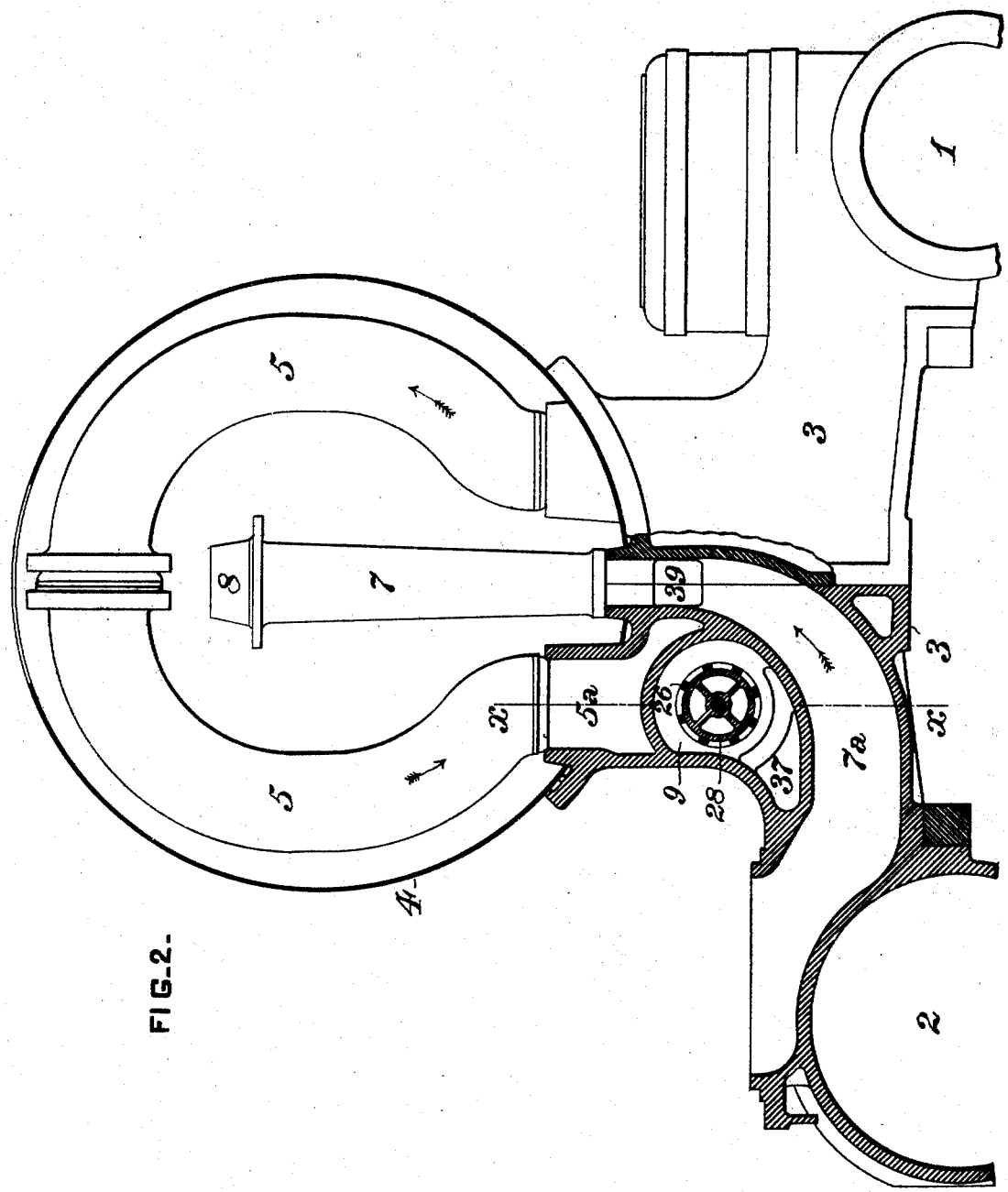

In the accompanying drawings: Figure 1 is a view, partly in side elevation, and partly in section at the line $x$, $x$, of Fig. 2, of the forward portion of a compound locomotive engine, illustrating an application of our invention; Fig. 2, a view, partly in front elevation, and partly in section at the line $y$, $y$, of Fig.

Figure 3:
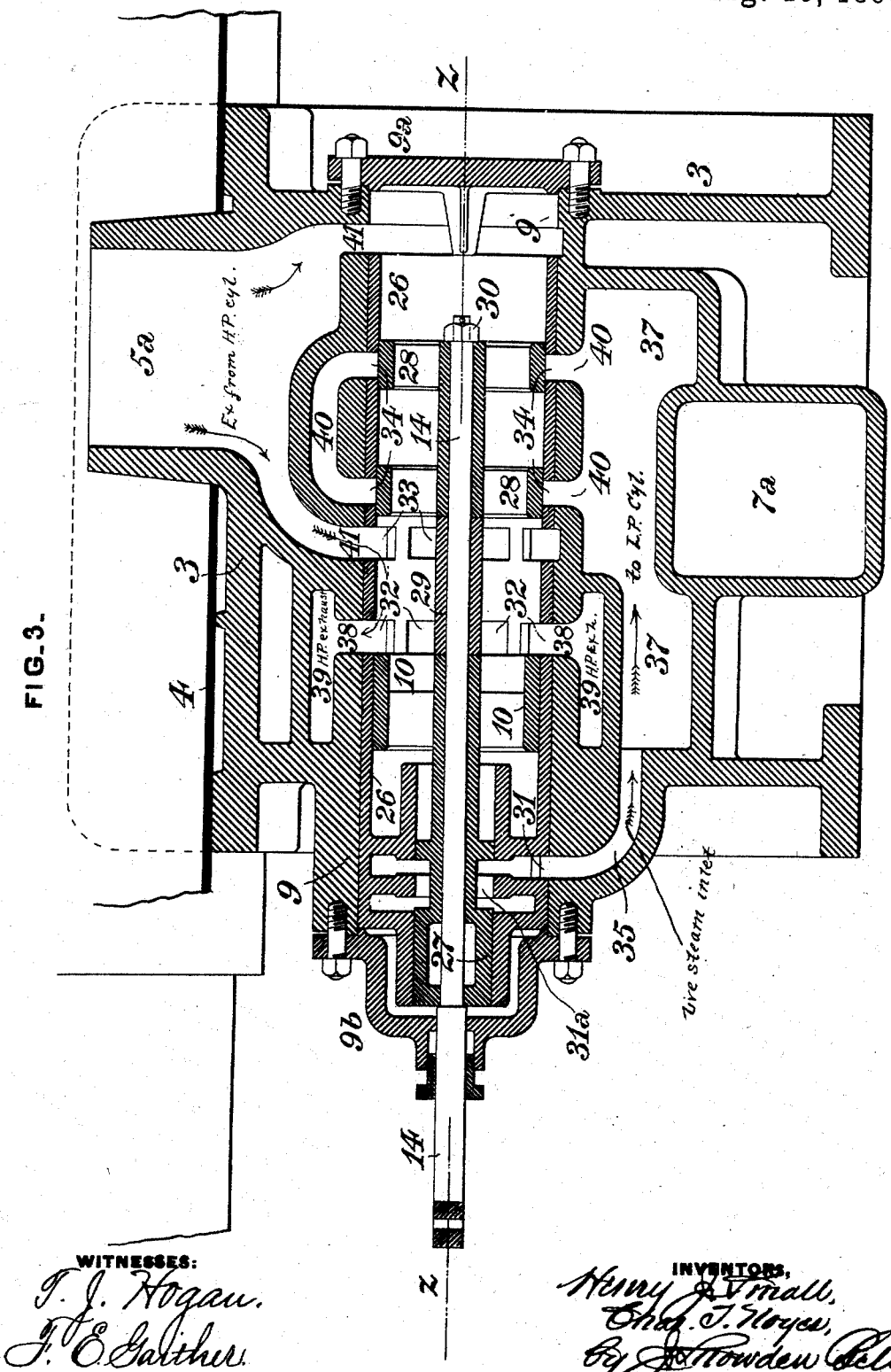
Figure 4:
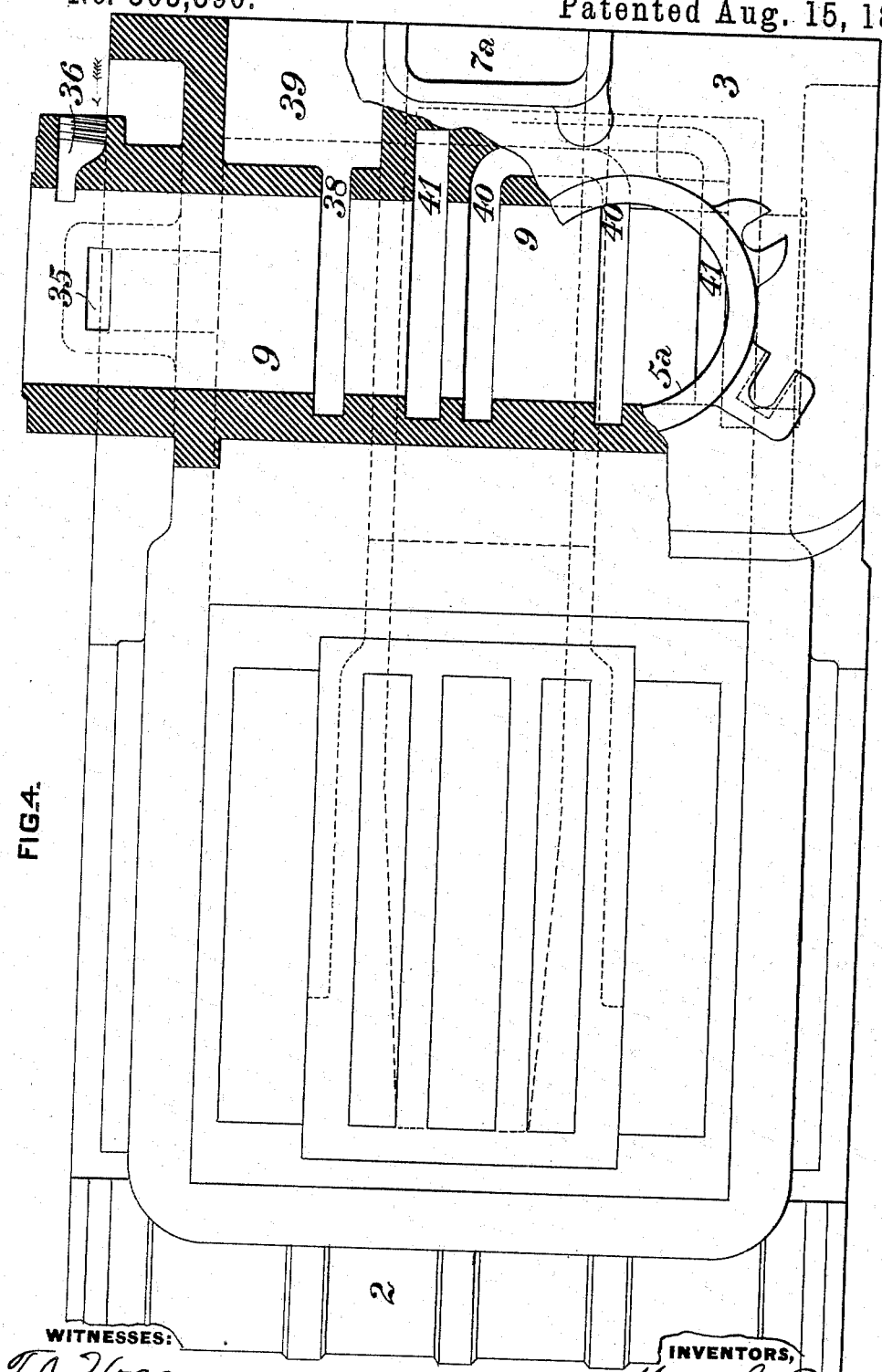
Figure 5:
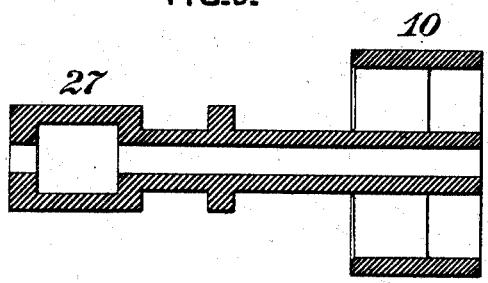
Figure 6:
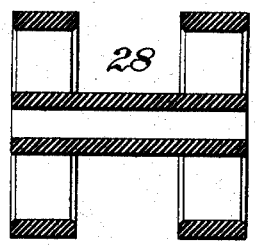
Figure 7:
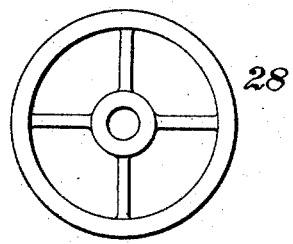
Figure 8:
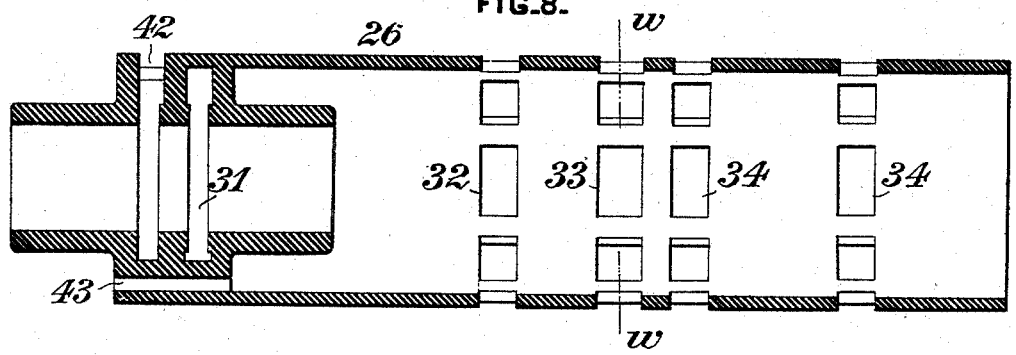
Figure 9:
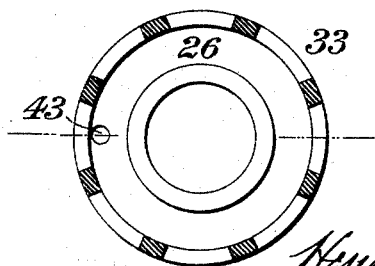

1; Fig. 3, a vertical section, on an enlarged scale, through the low pressure half saddle and the starting appliance, at the line $x$, $x$, of Fig. 2; Fig. 4, a plan view of the low pressure cylinder, partly in section at the line $z$, $z$, of Fig. 3; Figs. 5 and 6, longitudinal central sections through the valves of the starting appliance; Fig. 7, an end view of the valve which controls exhaust from the high pressure to the low pressure cylinder; Fig. 8, a longitudinal central section through the lining or bushing of the chest of the starting appliance; and, Fig. 9, a transverse section through the same at the line $w$, $w$, of Fig. 8.

Our invention is herein shown as applied in connection with a two cylinder compound locomotive engine, of the receiver type, having a high pressure cylinder 1, and a low pressure cylinder 2, each of which is cast integral with one half or section of a two part saddle or bed plate 3, of the ordinary type, upon which the smoke box 4 is supported, and within which, and in the cylinders, are formed the usual ports and passages for the supply and exhaust of steam to and from the cylinders, as practiced in engines of this type. The exhaust passage of the high pressure cylinder communicates, through a receiver 5, composed of two curved pipes passing through the smoke box, and connected at their upper ends, with the supply passage of the valve chest of the low pressure cylinder, and the exhaust passage of the low pressure cylinder communicates with a central exhaust pipe 7, having a nozzle 8 at its upper end, through which the exhaust steam of the low pressure cylinder is discharged into the stack.

In the practice of our invention, we form in the half of the saddle 3 which carries the low pressure cylinder 2, a chamber or chest 9, which is preferably located similarly to the intercepting valve chests heretofore employed in engines of this type, and is closed at its front and rear ends, respectively, by removable caps, $9^a$, $9^b$. The chest 9 is lined with an open ended sleeve or valve bushing 26, which is bored out truly, to receive and admit of the reciprocation of the valves of the starting appliance, and is provided with a series of circumferential ports or openings controlled by said valves, as presently to be described. A stem 14 is fitted to slide freely through a properly packed stuffing box in the back head $9^b$, of the valve chest, and carries three valves 27, 10, and 28, which are of the piston type, the valve 27 fitting a bore of reduced diameter at the back end of the valve bushing 26, and the valves 10 and 28 fitting the larger bore of the remainder of the bushing. The several valves are provided with central hubs fitting the stem 14, and are secured thereon between a shoulder abutting against the valve 27 and a nut 30 engaging a screw thread at the front end of the stem, a sleeve or distance piece 29 being interposed between the valves 10 and 28 to locate said valves at the proper distance apart.

The valve 27 performs the function of directly effecting the admission of boiler steam to the low pressure cylinder 2, in the starting of the engine, and may therefore be designated as the low pressure direct supply valve. To this end, said valve controls communication between a steam opening or nozzle 36, located adjacent to the rear end of the bushing, and adapted to be connected with a pipe leading from the steam space of the boiler, (in which pipe a reducing valve may be fitted, if desired,) and a passage 37 in the saddle, out of which passage lead the steam supply ports of the low pressure valve chest, in the usual manner. Such communication is effected, when the valve is in the position shown in the drawings, through a side port 42 in the valve bushing 26, which is open to the nozzle 36, a port $31^a$, in a transverse partition or diaphragm in the bushing, said port being opened and closed by the valve 27, and a bottom port 31 in the bushing which is open to a port 35 formed in the saddle and leading into the passage 37. Equilibrium of pressure on opposite sides of the valve 27 is maintained by means of a port 43 in the bushing, establishing communication between the interior thereof, and the rear side of the valve.

The valve 10 performs the function of effecting independent exhaust of steam from the high pressure cylinder and the receiver, in the starting of the engine, and may therefore be designated as the high pressure independent exhaust valve. To this end, said valve controls ports 32 in the bushing and ports 38, in line therewith, in the valve chest 9, said ports 32 and 38, when open, as shown in the drawings, establishing communication between the exhaust passage of the high pressure cylinder and a passage 39, in the low pressure cylinder saddle, leading into the main exhaust pipe 7. Such communication is effected through the receiver 5, receiver connection passage $5^a$, ports 41 in the valve chest, ports 33 in the bushing, and through the bore of the bushing and skeleton or open frame body of the valve 28.

The valve 28 performs the function of intercepting or cutting off the exhaust of steam from the high pressure cylinder and the receiver to the low pressure cylinder, in the starting of the engine, and may therefore be designated as the intercepting valve, and also prevents boiler steam from passing from the passage 37, through the ports 40, 34, and 38, into the exhaust passage 39, and thence to the atmosphere. To this end, said valve, when in the position shown in the drawings, closes ports 34 in the bushing, and ports 40, in line therewith, in the valve chest 9, through which ports 34 and 40, when open, the exhaust steam from the high pressure cylinder and the receiver passes into the passage 37 in the saddle, which leads to the steam supply ports of the low pressure valve chest.

The connected valves 27, 10 and 28, are moved coincidently within the bushing of the valve chest, so as to open and close their respective ports, by mechanism connected with and operated by the reversing gear of the engine, an instance of which, as shown in the drawings, will now be described, the same having been adopted for illustration for the reason that it has been found to operate satisfactorily in practice. The connected system of valves, being perfectly balanced, there is no greater effort necessary, on the part of the engineer, in reversing, than with an ordinary simple engine. In this construction, the valve stem 14 is suitably prolonged by a connected extension $14^a$, and said extension, which may, if preferred, be made integral with the stem, is coupled, by a link 24, to the lower arm of a bell crank or angle lever 22, journaled in a bearing fixed upon the guide brace or otherwise suitably supported on the engine frame. The upper arm of the bell crank 22 is coupled, by a link 20, to the reverse arm 21, which is secured upon a reverse shaft, and swung with said shaft, in the bearings thereof, to raise and lower the valve links, by a reach rod $21^a$, extending to a reverse lever in the cab, operated by the engineer, the reversing mechanism being similar to that employed in ordinary practice, and not forming, in and of itself, any part of our present invention.

Through the above described, or any similarly operating system of connections, longitudinal movement will be imparted to the valve stem 14, and the connected valves 27, 10, and 28, in and by the movement of the reverse arm 21, effected by the reach rod $21^a$ and reverse lever, the direction and degree of the movement of the valve stem and valves being such that the ports controlled by the valves 27 and 10 are open, and the ports controlled by the valve 28 are closed, when the reverse arm and reverse lever are moved into either full forward or full backward position, and, when the reverse lever and reverse arm are moved into any intermediate position, the ports controlled by the valves 27 and 10 are closed, and the ports controlled by the valve 28 are open. As shown in the drawings, the reverse arm is in full forward position, the port $31^a$, controlled by the valve 27, and the ports 32 and 38, controlled by the valve 10, are fully open, and the ports 40, controlled by the valve 28, are closed. As the reverse lever is hooked back, to raise the valve links, the coupling link 20 moves the end of the upper arm of the bell crank 22 upwardly, and consequently moves the end of the lower arm of the bell crank; and the connected valve stem and valves of the starting appliance, forwardly, thereby closing the ports $31^a$, 32 and 38, and opening the ports 40. The valves 27, 10, and 28, and the distance between the ports 40, are made of such length that the ports $31^a$, 32 and 38 will remain closed, and the ports 40 remain open, during all the forward and backward traverse of the valve stem and valves, except that slight portion thereof in which the opening and closure of the respective ports is effected.

The forward movement of the valve stem and valves continues, without changing the closed and open condition, respectively, of the several ports, in the backward movement of the reverse arm to central or vertical position. As the reverse arm is moved from its central, toward its full backward position, the link 20 moves the end of the upper arm of the bell crank 22 downwardly, and consequently moves the end of the lower arm of the bell crank, and the connected valve stem and valves, backwardly, such backward movement continuing until the reverse arm is brought to full backward position, in which the bell crank, valve stem, and valves will stand in the same positions as when the reverse arm is in the full forward position shown in the drawings.

It will be obvious that the required direction and range of longitudinal movement may be imparted to the valve stem and valves of our appliance, by the reversing gear, through connections differing structurally from those described, and that such modification of detail may readily be made by a skilled mechanic, familiar with our invention, without departure from its essential and characteristic features. We do not, therefore, desire to limit ourselves to the specific system of intermediate connections herein exemplified, as we consider any suitable mechanism for transmitting movement positively from a reversing gear to a connected series of valves substantially as above described, in such manner that the closure and opening thereof shall be effected in and by the movements of the reversing gear, and in the described relation thereto, to be the mechanical equivalent of the specific intermediate connections herein set forth.

As will be seen from the drawings, our invention is readily and conveniently applicable, without involving other structural modifications, in two cylinder compound engines of the type ordinarily employed, and also that its operation, which is positive in starting in either direction, is effected without necessitating the employment of additional levers or valve handles, and without any manipulation or attention, on the part of the engineer, additional to that which is required and is practiced in starting an ordinary engine, either simple or compound.

We claim as our invention and desire to secure by Letters Patent—

1. In a compound engine, the combination of a balanced piston valve directly controlling the admission of boiler steam to the low pressure cylinder, a valve controlling independent exhaust from the high pressure cylinder, a chest in a cylinder saddle in which said valves operate and actuating mechanism connecting said valves with the reversing gear of the engine, substantially as set forth.

2. In a compound engine, the combination of a balanced piston valve directly controlling the admission of boiler steam to the low pressure cylinder, a valve controlling independent exhaust from the high pressure cylinder, a valve controlling exhaust from the high to the low pressure cylinder, a chest in a cylinder saddle in which said valve operates and actuating mechanism connecting said valves with the reversing gear of the engine, substantially as set forth.

3. In a compound engine, the combination of a saddle or bed plate, high and low pressure cylinders formed or fixed thereon, a valve chest in said saddle, a balanced piston low pressure direct supply valve fitted to work on said valve chest and controlling a port in the saddle establishing communication between a boiler steam supply connection to said chest and the low pressure cylinder steam supply passage of the saddle, a valve stem upon which said valve is secured, and actuating mechanism connecting said valve stem with the reversing gear of the engine, substantially as set forth.

4. In a compound engine, the combination of a saddle or bed plate, high and low pressure cylinders formed or fixed thereon, a valve chest in said saddle, a balanced piston high pressure independent exhaust valve fitted to work in said valve chest and controlling a port establishing communication between the exhaust passage of the high pressure cylinder and a passage in the saddle leading to the low pressure exhaust passage therein, a valve stem upon which said valve is secured, and actuating mechanism connecting said valve stem with the reversing gear of the engine, substantially as set forth.

5. In a compound engine, the combination of a saddle or bed plate, high and low pressure cylinders formed or fixed thereon, a valve chest in said saddle, a balanced piston intercepting valve fitted to work in said valve chest and controlling a port establishing communication between the exhaust passage of the high pressure cylinder and the low pressure cylinder steam supply passage of the saddle, a valve stem upon which said valve is secured, and actuating mechanism connecting said valve stem with the reversing gear of the engine, substantially as set forth.

6. In a compound engine, the combination of a saddle or bed plate, high and low pressure cylinders formed or fixed thereon, a valve chest in said saddle, a low pressure direct supply valve, a high pressure independent exhaust valve, and an intercepting valve, all of said valves being balanced pistons and fitted to work in and control appropriate ports and passages in the valve chest, and saddle a valve stem upon which said valves are secured, and actuating mechanism connecting said valve stem with the reversing gear of the engine, substantially as set forth.

7. In a compound engine, the combination of a saddle or bed plate, high and low pressure cylinders formed or fixed thereon, a valve chest in said saddle, a low pressure direct supply valve, a high pressure independent exhaust valve, and an intercepting valve, all fitted to work in and control appropriate ports in the valve chest, a valve stem upon which said valves are secured, a bell crank or angle lever working in a fixed bearing, a link coupling the valve stem to one arm of said bell crank, and a link coupling the other arm of said bell crank to a connection with the reverse lever, substantially as set forth.

HENRY J. SMALL.
CHARLES T. NOYES.

Witnesses:
H. M. La Rue, Jr.,
C. H. Oatman.